(12) United States Patent
Ausserlechner (10) Patent No.: US 7,362,166 B2
(45) Date of Patent: Apr. 22, 2008

(54) APPARATUS FOR POLARITY-INVERSION-PROTECTED SUPPLYING OF AN ELECTRONIC COMPONENT WITH AN INTERMEDIATE VOLTAGE FROM A SUPPLY VOLTAGE

(75) Inventor: Udo Ausserlechner, Villach (AT)

(73) Assignee: infinson Technologies AG, Munich (DE)

( * ) Notice: Subject to any disclaimer, the term of this patent is extended or adjusted under 35 U.S.C. 154(b) by 44 days.

(21) Appl. No.: 11/466,614

(22) Filed: Aug. 23, 2006

(65) Prior Publication Data
US 2007/0047165 A1    Mar. 1, 2007

(30) Foreign Application Priority Data
Aug. 24, 2005    (DE) .................... 10 2005 040 072

(51) Int. Cl.
*G05F 1/10*    (2006.01)
(52) U.S. Cl. .................................... 327/543
(58) Field of Classification Search ............... 327/534, 327/535, 537, 538, 540, 541, 543
See application file for complete search history.

(56) References Cited

U.S. PATENT DOCUMENTS

| | | | |
|---|---|---|---|
| 4,958,251 A | 9/1990 | Cini et al. ................... 361/84 |
| 5,036,269 A | 7/1991 | Murari et al. ............... 323/266 |
| 5,227,714 A | 7/1993 | Lou ........................... 323/282 |
| 5,821,601 A | 10/1998 | Yamamoto et al. ......... 257/579 |
| 6,018,261 A * | 1/2000 | Alford et al. ............... 327/307 |

FOREIGN PATENT DOCUMENTS

DE    19708019    3/1998

* cited by examiner

*Primary Examiner*—Jeffrey Zweizig
(74) *Attorney, Agent, or Firm*—Eschweiler & Associates, LLC (57) ABSTRACT

The apparatus for polarity-inversion-protected supplying of an electronic component with an intermediate voltage from a supply voltage has a first transistor connected between a terminal for the supply voltage and the electric component, so that a path between a source terminal and a sink terminal is flown through by a supply current of the electric component, a potential-to-current conversion device formed so that it generates a rising response current at a rising voltage drop across the path between source terminal and sink terminal of the first transistor, and a coupler formed to provide a follow current proportional to the response current at an output of the coupler depending on the response current, wherein the output of the coupler is coupled to a control terminal of the first transistor, wherein the potential-to-current conversion means has a second transistor providing the response current, and wherein the potential-to-current conversion device further has a potential shifter.

28 Claims, 2 Drawing Sheets

APPARATUS FOR POLARITY-INVERSION-PROTECTED SUPPLYING OF AN ELECTRONIC COMPONENT WITH AN INTERMEDIATE VOLTAGE FROM A SUPPLY VOLTAGE

CROSS-REFERENCE TO RELATED APPLICATIONS

This application claims priority from German Patent Application No. DE 10 2005 040 072.8, which was filed on Aug. 24, 2005, and is incorporated herein by reference in its entirety.

TECHNICAL FIELD

The present invention relates to an apparatus for polarity-inversion-protected supplying of an electronic component with an intermediate voltage from a supply voltage, and particularly to an apparatus for polarity-inversion-protected supplying of semiconducting switching elements and arrangements of semiconducting switching elements, such as chips.

BACKGROUND

High demands are made on the supply of electric components with electric energy, and here particularly on the supply of semiconducting chips. An important demand is to perform the energy supply in polarity-inversion-protected manner. Within the scope of the present application, by "polarity-inversion-protected supply" of an electric component or of a chip, a supply with electric voltage is understood, in which the input resistance at a terminal designed for a positive voltage for example becomes sufficiently high-ohmic when applying a negative voltage, so that the resulting current flow does not lead to thermal overload. Moreover, all elements also need to have the required voltage strength.

A first possible embodiment of a polarity-inversion-protected supply of an electric component is to connect a diode or a transistor connected as a diode between an external supply voltage Vsup,ext and a regulation circuit providing an internal regulated supply voltage Vsup,int, so that the diode is operated in pass direction when a positive supply voltage Vsup,ext is applied, and in blocking direction in the case of a negative external supply voltage Vsup,ext. Here, within the scope of the present application, in the case of transistors, an emitter terminal of a bipolar transistor or a source terminal of a field-effect transistor is understood by a source terminal, a collector terminal of a bipolar transistor and a drain terminal of a field-effect transistor by a sink terminal, as well as a base terminal of a bipolar transistor and a control terminal or gate terminal of a field-effect transistor by a control terminal.

Figure 2:
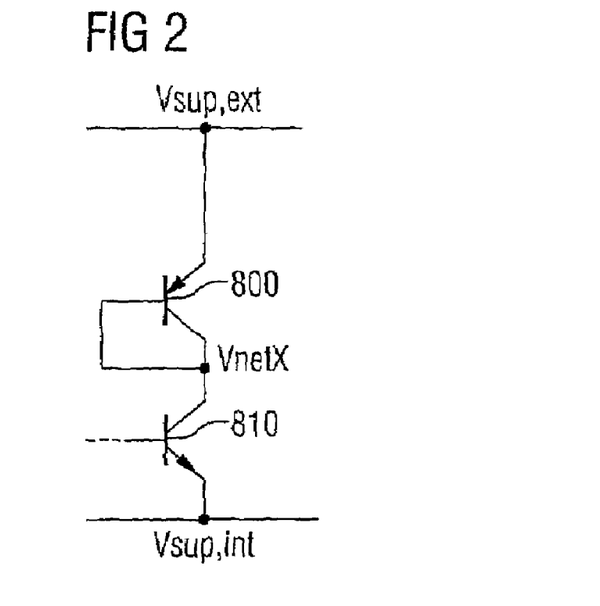
FIG. 2 is a circuit diagram of a first possible embodiment of a polarity-inversion-protected current supply circuit.

FIG. 2 shows such a circuit of a possible realization of a polarity-inversion-protected supply of an electric component. FIG. 2 shows a series connection of a pnp bipolar transistor 800 and an npn bipolar transistor 810, which are connected to the external supply voltage Vsup,ext with an emitter terminal of the pnp bipolar transistor 800 and to a regulated internal supply voltage Vsup,int with an emitter terminal of the npn bipolar transistor 810. A collector terminal of the pnp bipolar transistor 800 is connected to a collector terminal of the npn bipolar transistor 810 and a base terminal of the pnp bipolar transistor 800.

A base terminal of the npn bipolar transistor 810 is connected to a regulating means not included in FIG. 2. The regulating means not shown in FIG. 2 regulates the internal, regulated supply voltage Vsup,int from a voltage VnetX present at the collector terminal of the npn bipolar transistor 810. The regulating means is not shown in FIG. 2, since it is not subject matter of the present application, but rather known.

The npn bipolar transistor 810, via which the actual regulation of the internal regulated supply voltage Vsup,int is done, is, however, not polarity-inversion-protected with reference to a positive external supply voltage Vsup,ext. This is due to the fact that, especially with integrated circuits constructed on a semiconductor substrate doped with holes (p substrate), the diode formed between collector and substrate is operated in pass direction and destroyed due to the high voltage present and the current flow resulting therefrom, when applying a great-magnitude negative voltage (e.g. −20 V) to the area doped with electrons, which forms the collector of the npn bipolar transistor 810 (n collector).

In other words, if the intermediate voltage Vsup,ext (e.g. 3 V . . . 30 V) is applied to the IC (integrated circuit), the IC generates an internal, regulated voltage Vsup,int (e.g. 2.5 V), by suitably regulating the base of the npn bipolar transistor 810 (not shown, since prior art). Here, the npn bipolar transistor 810 functions as a series regulator (pass transistor). The collector of the npn bipolar transistor 810 is, however, not polarity-inversion-protected: i.e., when applying a voltage negative as opposed to the p substrate lying at ground potential or at a reference potential (e.g. −20 V), the collector-substrate diode opens, draws a lot of current and is destroyed.

A possible polarity inversion protection is to connect a diode or a pnp bipolar transistor 800 connected as a diode, as FIG. 2 shows, between the external supply potential Vsup,ext and the collector terminal of the npn bipolar transistor 810. A connection of a pnp bipolar transistor, as shown by FIG. 2 for the pnp bipolar transistor 800, in which the base terminal and the collector terminal are connected or shorted by a low-ohmic line, is also referred to as a transistor diode. In case of a polarity inversion, a voltage negative as opposed to the reference potential is present at the area doped with holes of the semiconducting substrate, which forms the emitter of the pnp bipolar transistor 800, so that the pnp bipolar transistor 800 blocks.

In other words, the above described opening of the collector-substrate diode, drawing a large current, and the destruction of the npn bipolar transistor 810, which will also be referred to as regulating transistor in the following, is prevented in the prior art by laying a pnp transistor 800 connected as a diode between the collector of the npn bipolar transistor and the external supply pin. Thus, the p emitter of the pnp bipolar transistor 800, which blocks at a negative potential as opposed to the substrate (negative voltage at p), is located at an external supply pin.

The disadvantage of this solution is that the transistor diode 800 requires at least a potential difference of a flow voltage between its emitter terminal and its collector terminal, so as to become conducting. Within the scope of the present application, by a flow voltage, a potential difference between an anode terminal and a cathode terminal of a diode or between a base and an emitter terminal of a bipolar transistor is understood, which leads to a current flow through the diode or to a collector current through the bipolar transistor of 1 mA, wherein the diode and the bipolar transistor are operated in pass direction. A flow voltage thus corresponds to about the voltage at which a bend occurs in case of a diode characteristic curve or the transmission characteristic curve of a bipolar transistor.

In case of a diode or a transistor diode based on silicon, a flow voltage thus typically ranges from about 500 mV to 800 mV. Since a voltage between 20 mV and 250 mV, which is also referred to as saturation voltage and corresponds to the output characteristic curve field of a typical bipolar transistor of the collector-emitter voltage at which the output characteristic curves have a bend, also typically drops in a bipolar transistor across the path between a collector terminal and an emitter terminal at a collector current of 1 mA, the circuit in FIG. 2 requires an external supply voltage Vsup,ext exceeding at least the internal, regulated supply voltage Vsup,int by the sum of a flow voltage and a saturation voltage. This means that the external supply voltage Vsup,ext has to be greater than 3.5 V, for example, at an internal, regulated supply voltage Vsup,int of about 2.5 V.

In other words, the disadvantage of the circuit shown in FIG. 2 is that the diode 800 requires at least a flow voltage so as to become conducting. This means, when for example Vsup,int is regulated to 2.5 V, the circuit only functions for external supply voltages Vsup,ext of about 3.5 V and above at low temperatures, because then the base-emitter voltage of the bipolar transistor 800 becomes about 0.9 V and the npn bipolar transistor 810 still needs at least 0.1 V saturation voltage so as to be able to work.

A further procedure to realize a possible polarity inversion protection is the so-called "low-drop" technology. Here, the regulation of the internal, regulated supply voltage Vsup,int from the external supply voltage Vsup,ext is no longer done via an npn bipolar transistor, as it is shown in FIG. 2, but a pnp bipolar transistor is rather used also for the regulation of the internal supply voltage Vsup,int. In other words, the npn emitter follower may of course be omitted and constitute a series regulator solely with a pnp bipolar transistor. This procedure solves the problem of the flow voltage occurring in addition, as it occurs in an additional series-connected diode or transistor diode. In this case, the circuit functions as long as the external supply voltage Vsup,ext exceeds the internal, regulated supply voltage Vsup,int by at least the saturation voltage, i.e. typically between 20 and 250 mV.

In other words, this procedure solves the problem of the drop voltage: The circuit functions as long as the external supply voltage Vsup,ext is greater than the sum of the regulated, internal supply voltage Vsup,int and about 100 mV. The disadvantage of this solution is that the internal, regulated supply voltage Vsup,int now lies at a collector of a pnp bipolar transistor, which is substantially more high-ohmic than the emitter of the npn bipolar transistor 810 in FIG. 2. The reason for the higher internal resistance of the collector than that of the emitter is that the former constitutes a current source, but the latter a voltage source, and lies in the slope of the Ice-Uce output characteristic curve (output characteristic curve Ice versus Uce) as well as the Ie-Ube input characteristic curve (input characteristic curve Ie versus Ube). Thereby, it becomes much more difficult to keep the locked loop of the internal, regulated supply voltage Vsup,int stable, particularly when the capacitive load at Vsup,int has not exactly been determined yet. So as to guarantee the regulation of the internal, regulated supply voltage Vsup,int in this case, the internal, regulated supply voltage Vsup,int has to be loaded to the reference potential or also to ground via a stabilizing load or also a shunt path. The current flowing off through the stabilizing load is used for stabilizing the regulating circuit and thus reduces the current efficiency of such a current regulation, wherein the current efficiency is defined as the ratio of the current the regulation gives off to the actual load connected thereto divided by the overall current consumption, i.e. including the own current consumption of the regulation.

In other words, a relatively large current (as compared with the overall current need of the circuit) has to be sunk from Vsup,int via a shunt path or stabilizing load to ground, in order to keep the locked loop stable. This current is used for achieving the stability and wastes and reduces the efficiency of such a voltage regulation: For example, if Vsup,int is loaded with 5 mA, about 1.7 mA additional current is needed in order to keep the low-drop regulator stable. Its efficiency thus is about 75%, whereas the efficiency of the emitter follower shown in FIG. 2 is far higher at about 90%.

Figure 3:
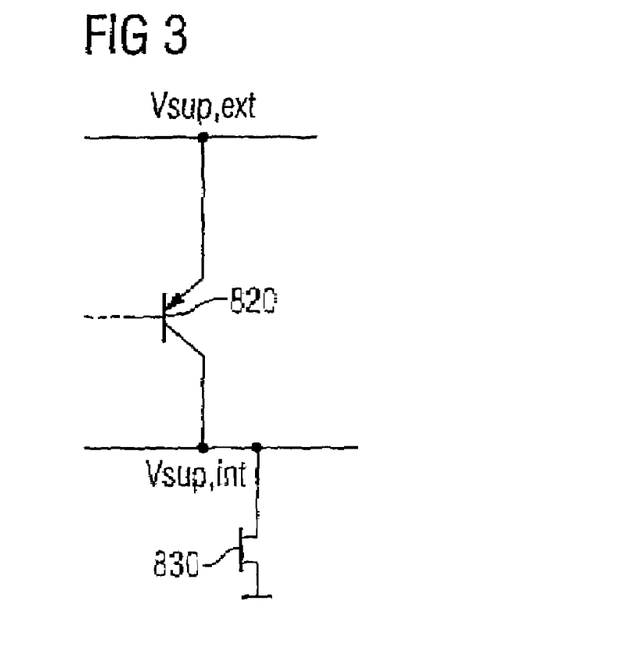
FIG. 3 is a circuit diagram of a second possible embodiment of a polarity-inversion-protected current supply circuit in "low-drop" technology.

FIG. 3 shows an example for such a low-drop circuit. A pnp bipolar transistor 820 is connected to the external supply voltage Vsup,ext with an emitter terminal and to the regulated, internal supply voltage Vsup,int with a collector terminal. A base terminal of the pnp bipolar transistor 820 is connected to a regulating unit not included in FIG. 3 since it is known and does not represent the subject matter of the present application. Moreover, FIG. 3 shows an NMOS transistor 830 connected between the regulated, internal supply voltage Vsup,int and a reference potential.

The pnp bipolar transistor 820 here serves for the regulation of the internal supply voltage Vsup,int. The NMOS transistor 830 serves for loading the regulated, internal supply voltage Vsup,int and thus represents the stability load explained further above. Alternatively, instead of the NMOS transistor 830, also a PMOS transistor may be used as stability load. The advantage of this solution is that again a low-ohmic source terminal lies at the terminal for Vsup,int, and not a high-ohmic drain terminal.

SUMMARY

An improved concept for polarity-inversion-protected supply of an electronic component with an intermediate voltage, wherein the supply is to be guaranteed also at only slightly higher external supply voltage and is to have high current efficiency, provides an apparatus for polarity-inversion-protected supplying of an electronic component with an intermediate voltage from a supply voltage, having: a first transistor connected between a terminal for the supply voltage and the electric component, so that a path between a source terminal and a sink terminal of the first transistor is flown through by a supply current of the electric component; a potential-to-current converter formed so that it generates a rising response current at a rising voltage drop across the path between source terminal and sink terminal of the first transistor; and a coupler formed to provide a follow current proportional to the response current at an output of the coupler depending on the response current, wherein the output of the coupler is coupled to a control terminal of the first transistor; wherein the potential-to-current converter has a second transistor providing the response current; and wherein the potential-to-current converter further has a potential shifter coupled to the sink terminal of the first transistor and a control terminal of the second transistor, and formed to generate a potential dependent on a potential at the sink terminal of the first transistor at the control terminal of the second transistor.

BRIEF DESCRIPTION OF THE DRAWINGS

These and other objects and features of the present invention will become clear from the following description taken in conjunction with the accompanying drawings, in which.

DETAILED DESCRIPTION

Different embodiments are based on the finding that polarity inversion protection for the supply of an electronic component with an intermediate voltage from a supply voltage can be realized by connecting a transistor with a source terminal and a sink terminal between the supply voltage and the electronic component so that a supply current of the electronic component flows through the source terminal and the sink terminal of the transistor. Here, a control terminal of the transistor may be supplied with a voltage or a current by a regulating circuit, so that the voltage drop across the path between the source terminal and the sink terminal of the transistor is smaller than the voltage drop that would occur in the connection of a transistor as a diode in pass direction. Moreover, it is possible to design the regulating circuit coupled to the control terminal of the transistor so that it has little current consumption of its own as compared with the current need of the electronic component.

A preferred embodiment comprises such a potential-to-current conversion means, which makes a current available depending on the potential at the sink terminal of the transistor of a coupling means. A follow current, on the basis of which the second transistor is driven, is generated by the coupling means at an output of the coupling means.

Figure 1:
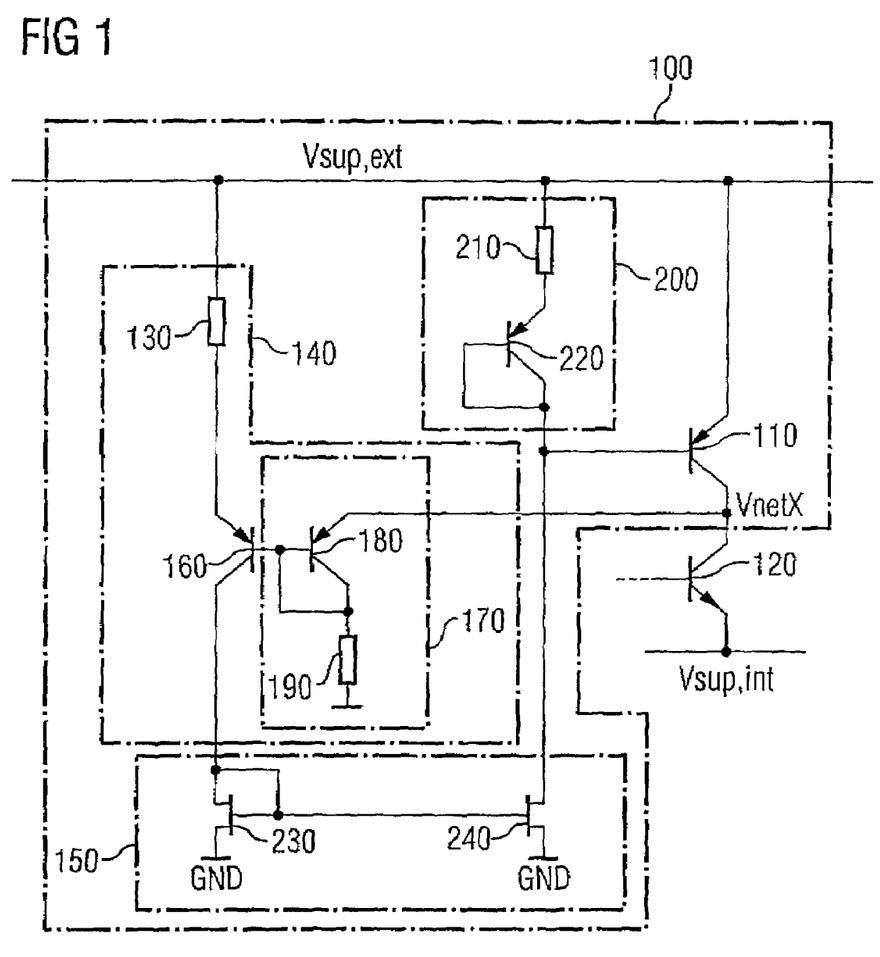
FIG. 1 is a circuit diagram of a polarity-inversion-protected current supply circuit according to an embodiment.

With reference to FIG. 1, an embodiment of a circuit for polarity-inversion-protected supply of an electronic component with an intermediate voltage from a supply voltage will be described in the following.

FIG. 1 shows a circuit diagram of an embodiment of a polarity-inversion-protected supply circuit 100. A first transistor 110, embodied as a pnp bipolar transistor, is coupled to a source terminal or emitter terminal at an external supply voltage Vsup,ext. Within the scope of the present application, in the case of transistors, here an emitter terminal of a bipolar transistor or a source terminal of a field-effect transistor is understood by a source terminal, a collector terminal of a bipolar transistor and a drain terminal of a field-effect transistor by a sink terminal, as well as a base terminal of a bipolar transistor and a control terminal or gate terminal of a field-effect transistor by a control terminal. A sink terminal or collector terminal of the first transistor 110, which also represents the output of the polarity-inversion-protected supply circuit 100, is connected to a collector terminal of a regulating transistor 120 embodied as an npn bipolar transistor and also referred to as series regulator. An emitter terminal of the regulating transistor or series regulator 120 is connected to the internal, regulated supply voltage Vsup,int. A control terminal or base terminal of the regulating transistor 120 is connected to a regulating circuit not illustrated in FIG. 1, since a possible solution is known and not the subject matter of the present application. A potential VnetX is present at the sink terminal of the first transistor 110.

Apart from the first transistor 110, the supply circuit 100 also includes a potential-to-current conversion means 140 also referred to as voltage-current converter or V-I converter, and a coupling means 150. An input of the potential-to-current conversion means 140 is coupled to the external supply voltage Vsup,ext. An output of the potential-to-current conversion means 140 is connected to an input of the coupling means 150. The V-I converter 140 includes a first resistor 130, which comprises a first terminal representing the input of the V-I converter 140, a second transistor 160 embodied as a pnp bipolar transistor, and a potential shifting means 170. A second terminal of the first resistor 130 is connected to an emitter terminal of the second transistor 160 of the V-I converter 140, which also represents the input of the potential-to-current conversion means 140. A collector terminal of the second transistor 160, which also represents the output of the potential-to-current conversion means 140, is connected to an input of the coupling means 150. A control terminal of the second transistor 160 is connected to an output of the potential shifting means 170. The potential shifting means 170 includes a third transistor 180 and a second resistor 190. The third transistor 180 is embodied as a pnp bipolar transistor in the present embodiment. The second resistor 190 is connected between a sink terminal or collector terminal of the third transistor 180 and a reference potential. A source terminal or emitter terminal of the third transistor 180, which represents an input of the potential shifting means 170 and a further input of the V-I converter 140, is connected to the sink terminal or collector terminal of the first transistor 110. Moreover, the collector terminal of the third transistor 180 is coupled to a control terminal or a base terminal of the third transistor 180 via a low-ohmic, conducting connection, which will also be referred to as shorted in the further course of the present application, so that the third transistor 180 is operated as a diode. Moreover, the two control terminals or base terminals of the second transistor 160 and the third transistor 180 are connected to each other. The second transistor 160 and the third transistor 180 thus are of the same type. Generally speaking, this means that both transistors are designed as pnp bipolar transistors, as npn bipolar transistors, as NMOS transistors, or as PMOS transistors.

An output of the coupling means 150 is connected to the control input of the first transistor 110 on the one hand and to a first terminal of a drive circuit 200 on the other hand. A second terminal of the drive circuit 200 is coupled to the external supply voltage Vsup,ext with a further terminal. The drive circuit 200 includes a series connection of a third resistor 210 and a fourth transistor 220, which is embodied as a pnp bipolar transistor, wherein an emitter terminal of the fourth transistor 220 is connected to the third resistor 210 and a collector terminal of the fourth transistor 220 to the first terminal of the drive circuit 200 on the one hand, and a control terminal or base terminal of the fourth transistor 220 on the other hand, so that the fourth transistor 220 is connected as a diode.

The coupling means 150 includes a fifth NMOS transistor 230 and a sixth NMOS transistor 240, wherein a control terminal or gate terminal of the fifth NMOS transistor 230 is connected to a control terminal of the sixth NMOS transistor 240 as well as to a sink terminal or drain terminal of the fifth NMOS transistor 230, which also represents the input of the coupling means 150. A sink terminal or drain terminal of the sixth NMOS transistor 240 represents the output of the coupling means 150. A source terminal of the fifth NMOS transistor 230 and a source terminal of the sixth NMOS transistor 240 are connected to the ground potential (GND). The fifth NMOS transistor 230 and the sixth NMOS transistor 240 thus form a current mirror circuit.

In the following, the functioning of the above-described circuitry, which is a current-efficient, polarity-inversion-protected low-drop regulator, will be explained in greater detail. The embodiment shown in FIG. 1 solves the problem of the voltage drop, also referred to as drop, across the first transistor 110 acting as a diode as a result of the connection of the pnp bipolar transistor 800 in possible circuits, as this is illustrated in FIG. 2, and the problem, which occurs in possible circuits, of the current sunk for stabilization of the regulating circuit, which is also referred to as shunt current, as it has been explained in connection with the circuit illustrated in FIG. 3, which shows one possible solution. These two problems are solved by regulating the potential at the output of the polarity-inversion-protected supply circuit 100, and thus at the collector terminal of the first transistor 110, to a value VnetX, which typically lies between 20 mV and 500 mV, preferably 50 mV to 200 mV, below the external supply voltage Vsup,ext. The voltage or potential difference VnetX as opposed to the reference potential is also referred to as intermediate voltage, and the accompanying potential also as intermediate potential, whereas Vsup,ext−VnetX is the collector-emitter voltage of the first transistor 110. In other words, the problem of the drop of the possible realization of a polarity-inversion-protected voltage supply in FIG. 2 and of the shunt current of the possible realization of a polarity-inversion-protected voltage supply in FIG. 3 can be solved by a regulating circuit regulating the potential at a node at the collector terminal of the first transistor 110 to a value lying about 100 mV below the external supply voltage Vsup,ext.

To this end, the potential VnetX present at the collector terminal of the first transistor 110 is made available to the potential shifting means 170 as an input signal. Due to the potential difference present at the series connection of the third transistor 130 connected as a diode and the second resistor 190, a current flows off via the collector terminal and the emitter terminal of the third transistor 180 and the second resistor 190. Due to the series connection of the third transistor 180 and the second resistor 190, a potential differing from the potential VnetX present at the collector terminal of the first transistor 110 by about a flow voltage of a pn junction is present at the output of the potential shifting means 170, i.e. the base terminal of the third transistor 180. Typically, the potential difference between the base input of the second transistor 160 and the collector terminal of the first transistor 110, i.e. the potential at the base terminal of the second transistor 160 and the potential VnetX, deviates from a flow voltage of a pn junction by less than 50% of a flow voltage of a pn junction, and preferably by no more than 20% of a flow voltage of a pn junction. Within the scope of the present application, by a flow voltage, a potential difference between an anode and a cathode terminal of a diode or between a base terminal and an emitter terminal of a bipolar transistor is understood, which leads to a current flow through the diode or a collector current through the bipolar transistor of 1 mA, wherein the diode and the bipolar transistor are operated in pass direction. A flow voltage thus corresponds to about the voltage at which a bend occurs in case of a diode characteristic curve or the transmission characteristic curve of a bipolar transistor. In case of a diode or a transistor, which is based on silicon, a flow voltage thus typically ranges from about 500 mV to 800 mV. As a result, a potential difference between the collector terminal of the first transistor 110 and the base terminal of the second transistor 160, which is connected to the output of the potential shifting means 170, of typically 0.1 to 1.0 V, and preferably from 0.6 to 0.8 V, results this way. In other words, the potential at the base terminal of the second transistor 160 preferably ranges from about 0.6 V to 0.8 V below the potential at the collector terminal of the first transistor 110.

The first resistor 130 and the second resistor 190, as well as the second transistor 160 and the third transistor 180, are designed so that, in a rest state or equilibrium state of the locked loop or regulating circuit, a voltage deviating by no more than typically 50%, preferably 20%, from the voltage drop between the emitter terminal and the collector terminal of the first transistor 110 drops for an external supply voltage Vsup,ext, which lies above the intermediate potential VnetX by less than 1.5 V, due to an emitter current of the second transistor 160. Within the scope of the present application, by a rest state or equilibrium state of the regulating circuit or locked loop, a distribution of currents and potentials or voltages is understood, which are temporally constant in an ideal system. In this connection, within the scope of the present application, by an ideal system, a circuit is understood, the components of which comprise no random voltage fluctuations or current fluctuations generally referred to as noise.

In other words, for the regulation of the potential VnetX to a value of about Vsup,ext −100 mV, a current is drained to the reference potential (GND) or to ground via the third transistor 180 and second resistor 190, which current thus generates a potential generating the same voltage across the first resistor 130 in a rest state of the locked loop as is present across the collector-emitter path of the first transistor 110 at the base terminal of the second transistor 160. In still other words, in the rest state of the locked loop, a voltage that is ideally equal to the voltage across the collector-emitter path of the first transistor 110 is generated across the first resistor 130.

In still other words, the first resistor 130 causes an emitter potential at the emitter terminal of the second transistor 160, which corresponds to the intermediate potential VnetX, and thus determines a dependence of the current given off to the collector terminal of the second transistor 160, and of the intermediate potential VnetX. A resistance R130 of the first resistor 130 thus determines, in a first approximation, a linear relationship between a voltage V and a current I flowing at the output of the V-I converter 140, which meets the dependence I=V/R130 in a first approximation.

In the present embodiment, the coupling means 150 is formed so that it provides, at its output, i.e. at the sink terminal or drain terminal of the sixth NMOS transistor 240, a follow current deviating from a collector current of the second transistor 160 and/or the response current of the V-I converter 140 at the input of the coupling means 150, i.e. at the sink terminal or drain terminal of the fifth NMOS transistor 230, by typically no more than 30%, preferably by no more than 10%, of the response current.

By the coupling means 150 and/or by the current mirror circuit including the fifth NMOS transistor 230 and the sixth NMOS transistor 240, a follow current proportional to the collector current of the second transistor 160 is provided at the output of the coupling means 150. The drive circuit 200 connected to the external supply voltage Vsup,ext at its second terminal and including the third resistor 210 and the fourth resistor 220 and connected to both the base terminal of the first transistor 110 and the output of the coupling means 150 with its first terminal has a non-linear current-voltage characteristic curve. Due to the series connection of the third resistor 210 and the fourth transistor 220 connected as a diode, the drive circuit 200 provides, at its first terminal, a potential which is smaller as opposed to the external supply voltage Vsup,ext by a potential difference dependent on a current flowing through the drive circuit 200 and given by about a sum of an ohmic voltage drop across the third resistor 210 and a flow voltage of a pn junction. Thus, depending on the follow current, a potential is provided at the base terminal of the first transistor 110 (or a base-emitter voltage of the first transistor 110 is provided), so that a voltage of typically 20 mV to 500 mV, preferably from 50 to 200 mV, drops in the equilibrium state of the regulation or the regulation circuit across the path between the emitter terminal and the collector terminal of the first transistor 110.

In other words, the potential present at the control input of the second transistor 160 generates a current flow copied, via the NMOS transistors 230 and 240, to a current path including the third resistor 210 and the fourth transistor 220 connected as a diode. Part of the current supplied from the sixth NMOS transistor 240 is further fed to the first transistor 110 as base current.

If the potential at the sink terminal (collector terminal) of the first transistor 110, i.e. the intermediate voltage VnetX, drops below the value of the intermediate voltage in the equilibrium state, a lower current flows to the reference potential via the input of the potential shifting means 170, the collector-emitter path of the third transistor 180, and the second resistor 190. As a result, the potential present at the base terminal of the transistor 160 decreases, so that the base-emitter voltage of the second transistor 160 rises, which in turn results in the fact that the collector current through the second transistor 160 increases. Due to the current mirror circuit including the two NMOS transistors 230 and 240, a higher follow current also flows through the drive circuit 200, so that a potential reduced as opposed to the equilibrium state is present at the base terminal of the first transistor 110. Due to the base-emitter voltage thereby increasing at the first transistor 110, the potential at the collector terminal of the first transistor 110 rises again, which closes the locked loop.

In other words, if the potential VnetX at the collector terminal of the first transistor 110 is too small in a non-equilibrium state of the regulating circuit, i.e. smaller than in the equilibrium state of the regulating circuit, the current flow through the third resistor 210 increases and opens the first transistor 110, so that an operating point, in which the first transistor is, shifts such that a collector-emitter voltage of the first transistor 110 decreases. Correspondingly, the collector terminal of the first transistor is pulled up or a greater current fed into the node at the collector terminal of the first transistor 110, which counteracts the voltage drop, which is increased as opposed to the equilibrium state, across the collector-emitter path of the first transistor 110.

In the design of the supply circuit 100, i.e. particularly in the design of the resistors 130, 190, and 210 as well as the transistors 110, 160, 180, 220, 230, and 240, achieving a difference between the potential of the external supply voltage Vsup,ext and the potential of the intermediate voltage VnetX of typically 20 mV to 500 mV and preferably from 50 mV to 200 mV is only necessary at values of the external supply voltage Vsup,ext typically lying above the internal, regulated supply voltage Vsup,int of the electronic component by less than 1.5 V and preferably by less than 300 mV. With an external supply voltage exceeding the value of the internal, regulated supply voltage Vsup,int by more than the above-mentioned voltages, a greater voltage drop across the path between the collector terminal and the emitter terminal of the first transistor 110 may also occur, without the basic functionality of the electronic component being at risk. In other words, this regulation only has to be exact at a minimum external supply voltage Vsup,ext. At greater external supply voltages Vsup,ext, the regulation is also allowed to permit greater differences between the external supply voltage Vsup,ext and the intermediate voltage VnetX of more than 100 mV, because in this case also a greater voltage is available. Rather, it is even of advantage if the voltage difference Vsup,ext−Vsup,int is distributed to the collector-emitter path of the first transistor 110 and of the regulating transistor 120 as uniformly as possible at great external supply voltages Vsup,ext, because the two transistors are then loaded minimally, and the voltage strength of the circuit thus increases.

A further advantage the supply circuit 100 shown in FIG. 1 has is that it comprises no extremely high-ohmic point, and that its output, which matches the collector terminal of the transistor 110, is not highly loaded capacitively, so that its frequency stability generally does not present a problem. In individual cases, it may be necessary to connect a frequency compensation capacitance between the base terminal and the collector terminal of the first transistor 110.

Moreover, the circuit may be designed so that the additional current need due to the transistors 160, 180, and 220 may be limited to typically less than 0.5 mA and preferably to less than 0.2 mA, so that the efficiency or the current efficiency of the voltage regulation is not degraded significantly. The additional space requirement on a chip also is not substantial as compared to a circuit according to FIG. 2, which shows one possible solution, since the circuitry only comprises three additional pnp bipolar transistors, three resistors, and two NMOS transistors in comparison with the circuit shown in FIG. 2, the space requirement of the two NMOS transistors being negligible in general.

In other words, the polarity inversion protection is still realized by a pnp transistor, but it is not connected as a diode, as the possible solutions in FIG. 2 and FIG. 3 show, or used directly for the regulation of the low-drop voltage regulator, but a stand-alone locked loop is constructed therewith, which regulates the potential at the collector of the npn emitter follower representing the series regulator to about Vsup,ext−100 mV. Technologically speaking, this can be realized more easily than usual low-drop regulators and consumes less current and space.

In other words, a regulated supply voltage Vsup,int, which is still guaranteed at a small external supply voltage Vsup,ext=Vsup,int+0.1 V, will be provided at the chip or on a chip. Here, the current efficiency of this regulation is about 90%. Furthermore, the circuit is polarity-inversion-protected, i.e. it is not destroyed even by applying negative voltages of about −20 V to a supply voltage pin. The embodiment illustrated in FIG. 1 thus represents a current supply with a polarity inversion protection with reduced drop and high efficiency.

Although the transistors 110, 120, 160, 180, and 220 are embodied as bipolar transistors in the preferred embodiment, these may also be embodied as field-effect transistors. Likewise, the two field-effect transistors 230 and 240, embodied as NMOS transistors in the preferred embodiment, may also be embodied as bipolar transistors. In particular, the regulating transistor or series regulator 120 may be embodied as a depletion NMOS transistor or self-conducting NMOS transistor, because driving this transistor can be done with a voltage lying below the internal, regulated supply voltage Vsup,int. Likewise, a circuit complementary to the circuitry shown in FIG. 1 may be used for polarity inversion protection at a negative external supply voltage, in which the npn bipolar transistors occurring may be exchanged for pnp bipolar transistors, the NMOS transistors occurring for PMOS transistors, and vice versa.

Moreover, a frequency compensation means, for example a Miller frequency compensation capacitance, may be connected between the control terminal or gate terminal and the sink terminal or drain terminal of the sixth NMOS transistor 240, in order to enhance the frequency stability. Likewise, a further frequency compensation means, for example a Miller frequency compensation capacitance, may be connected between the base terminal or the control terminal and the collector terminal or the sink terminal of the first transistor 110, in order to enhance the frequency stability.

The coupling means 150 embodied as current mirror circuit in the embodiment explained and including the NMOS transistors 230 and 240 may be replaced by a different coupling means, preferably a current mirror circuit with or without scaling of the current flow. For example, scale factors or mirror ratios of 1:2 or also 2:1 are absolutely possible. In principle, however, also a coupling means 150 with a scale factor deviating from these scale factors or mirror ratios, which are only to be seen as exemplary, may be employed. But a mirror ratio of about 1:1 is often more favorable. One possible embodiment for this is, for example, a Wilson current mirror, which can guarantee smaller deviation of the follow current from the response current as compared to the above-described coupling means 150.

The drive circuit 200 and the potential shifting means 170 explained in the above embodiment and both constructed from a resistor 210 and 190 and a transistor 220 and 180 connected as a diode in the preferred embodiment, respectively, may be constructed by a different arrangement of circuit elements, such as ohmic resistors, diodes, or other electronic components.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for polarity-inversion-protected supplying of an electronic component with an intermediate voltage from a supply voltage, comprising:
    a first transistor connected in such a way between a terminal for the supply voltage and the electric component, that a path between a source terminal and a sink terminal of the first transistor is flown through by a supply current of the electric component;
    a potential-to-current converter formed such that it generates a rising response current at a rising voltage drop across the path between source terminal and sink terminal of the first transistor; and
    a coupler formed to provide a follow current proportional to the response current at an output of the coupler depending on the response current,
    wherein the output of the coupler is coupled to a control terminal of the first transistor;
    wherein the potential-to-current converter comprises a second transistor providing the response current; and
    wherein the potential-to-current converter further comprises a potential shifter coupled to the sink terminal of the first transistor and a control terminal of the second transistor, and formed to generate a potential dependent on a potential at the sink terminal of the first transistor at the control terminal of the second transistor.

2. The apparatus of claim 1, wherein the first transistor is formed, due to its layer sequence, such that polarity inversion protection is realized.

3. The apparatus of claim 1, wherein the first transistor is a bipolar transistor, wherein the source terminal is an emitter terminal of the bipolar transistor, wherein the sink terminal is a collector terminal of the bipolar transistor, and wherein the control terminal is a base terminal of the bipolar transistor.

4. The apparatus of claim 1, wherein the first transistor is a pnp bipolar transistor.

5. The apparatus of claim 1, wherein the apparatus is formed for polarity-inversion-protected supplying, in order to regulate a difference between the supply voltage and the intermediate voltage to a value between 20 mV and 500 mV.

6. The apparatus of claim 1, wherein the second transistor is a bipolar transistor.

7. The apparatus of claim 1, wherein the second transistor is a pnp bipolar transistor.

8. The apparatus of claim 1, wherein a sink terminal of the second transistor is connected to an input of the coupler.

9. The apparatus of claim 1, wherein the coupler is formed as current mirror circuit.

10. The apparatus of claim 9, wherein the coupler comprises a plurality of NMOS transistors.

11. The apparatus of claim 1, wherein the coupler is formed so that the follow current deviates from the response current by less than 30%.

12. The apparatus of claim 1, wherein the coupler comprises a frequency compensator formed so as to enhance the frequency stability of the coupler.

13. The apparatus of claim 1, wherein the potential shifter is formed so that the potential at the control input of the second transistor follows the potential at the sink terminal of the first transistor.

14. The apparatus of claim 13, wherein the potential shifter is formed so that the difference of the potentials between the sink terminal of the first transistor and the control terminal of the second transistor lies between 0.1 V and 1.0 V.

15. The apparatus of claim 1, wherein the potential shifter is formed so that it comprises a semiconductor switching element with a pn junction, which is connected so that the pn junction is operated in pass direction.

16. The apparatus of claim 15, wherein the semiconductor device with a pn junction is formed as a bipolar transistor, wherein a base terminal and a collector terminal of the bipolar transistor are coupled by a conducting connection.

17. The apparatus of claim 16, wherein the second transistor and the semiconductor device comprise pn junctions of the same kind.

18. The apparatus of claim 1, wherein the potential shifter is formed so that the difference of the potentials between the sink terminal of the first transistor and the control terminal of the second transistor deviates from a flow voltage of a pn junction of the second transistor by no more than 50%.

19. The apparatus of claim 15, wherein the potential shifter comprises a resistor coupled to a reference potential and to the semiconductor device with the pn junction.

20. The apparatus of claim 1, comprising a drive circuit with a first terminal and a second terminal, wherein the first terminal of the drive circuit is coupled to the supply voltage, and wherein the second terminal of the drive circuit is coupled to the output of the coupler and the control terminal of the first transistor, which is formed so that it provides a potential dependent on the supply voltage and the current flowing therethrough at its second terminal.

21. The apparatus of claim 20, wherein the drive circuit comprises a further semiconductor switching element with a pn junction, which is connected between the first terminal and the second terminal of the drive circuit so that the pn junction is operated in pass direction.

22. The apparatus of claim 21, wherein the further semiconductor switching element with the pn junction is formed as a bipolar transistor, wherein a base terminal and a collector terminal of the bipolar transistor are coupled by a conducting connection.

23. The apparatus of claim 1, wherein the potential-to-current converter comprises a further resistor, and wherein a first terminal of the further resistor is connected to the supply voltage and a second terminal to the source terminal of the second transistor.

24. The apparatus of claim 23, wherein the further resistor is formed so that, for supply voltages lying less than 1.5 V above the intermediate voltage, in an equilibrium state of the circuit, a voltage dropping across the further resistor deviates from the voltage drop between the source terminal and the sink terminal of the first transistor by no more than 50%.

25. The apparatus of claim 1, further comprising a regulating transistor connected to the sink terminal of the first transistor for the regulation of a voltage derived from the intermediate voltage.

26. The apparatus of claim 25, wherein the first transistor is formed as a pnp bipolar transistor and the regulating transistor as an npn bipolar transistor.

27. The apparatus of claim 25, wherein the regulating transistor is formed as a self-conducting NMOS transistor.

28. An apparatus for polarity-inversion-protected supplying of an electronic component with an intermediate voltage from a supply voltage, comprising:
- a first transistor having a load path connected between a terminal for the supply voltage and the electric component;
- a potential-to-current converter comprising a second transistor generating a rising response current at a rising voltage drop across the load path; and
- a coupler formed to provide a follow current proportional to the response current fed to a control terminal of the first transistor,
- wherein the potential-to-current converter further comprises a potential shifter coupled to an output terminal of the first transistor and to a control terminal of the second transistor, and formed to generate a potential at the control terminal of the second transistor dependent on a potential at the output terminal of the first transistor.

* * * * *

UNITED STATES PATENT AND TRADEMARK OFFICE
CERTIFICATE OF CORRECTION

PATENT NO. : 7,362,166 B2
APPLICATION NO. : 11/466614
DATED : April 22, 2008
INVENTOR(S) : Ausserlechner It is certified that error appears in the above-identified patent and that said Letters Patent is hereby corrected as shown below:

On the title page item (73), "infinson Technologies AG" should read --Infineon Technologies AG--.

Signed and Sealed this

Nineteenth Day of August, 2008

JON W. DUDAS
*Director of the United States Patent and Trademark Office*